(12) United States Patent
Hogue (10) Patent No.: US 11,140,254 B2
(45) Date of Patent: Oct. 5, 2021

(54) SMART DEVICE SUPPORT

(71) Applicant: Trip Tech, LLC, Atascadero, CA (US)

(72) Inventor: Matthew Allen Hogue, Atascadero, CA (US)

(73) Assignee: TRIP TECH, LLC, Atascadero, CA (US)

( * ) Notice: Subject to any disclaimer, the term of this patent is extended or adjusted under 35 U.S.C. 154(b) by 0 days.

(21) Appl. No.: 16/906,723

(22) Filed: Jun. 19, 2020

(65) Prior Publication Data

US 2020/0322468 A1    Oct. 8, 2020

Related U.S. Application Data

(63) Continuation-in-part of application No. 16/564,363, filed on Sep. 9, 2019.

(60) Provisional application No. 62/728,943, filed on Sep. 10, 2018.

(51) Int. Cl.
*H04M 1/04* (2006.01)
*H04M 1/02* (2006.01)

(52) U.S. Cl.
CPC .......... *H04M 1/04* (2013.01); *H04M 1/0202* (2013.01)

(58) Field of Classification Search
CPC .. A45F 2200/0516; A45F 5/00; A45C 13/002; G03B 17/08; H04M 1/04; H04M 1/185
See application file for complete search history.

(56) References Cited

U.S. PATENT DOCUMENTS

| 8,302,769 B2 * | 11/2012 | Justiss ...................... A45F 5/02 206/38 |
| 8,636,183 B1 * | 1/2014 | Steiner ................... A45C 11/00 224/483 |
| 9,450,633 B1 | 9/2016 | Nguyen |
| 9,768,822 B1 * | 9/2017 | Loh ....................... H04M 1/185 |
| 9,968,169 B1 | 5/2018 | Pelton et al. |
| 2015/0163936 A1 * | 6/2015 | Le Gette ................ F16M 13/04 206/45.2 |
| 2015/0341712 A1 * | 11/2015 | Wilcox .................. H04R 7/045 381/332 |

(Continued)

FOREIGN PATENT DOCUMENTS

WO    WO2018058465    4/2018

*Primary Examiner* — Liton Miah
(74) *Attorney, Agent, or Firm* — Bennet K. Langlotz; Langlotz Patent & Trademark Works, LLC (57) ABSTRACT

Smart device supports have a frame defining a major plane and configured to connect to a smartphone, a pair of spaced-apart vent support elements each defining a louver gap configured to removably connect to a vehicle ventilation louver, the spaced-apart vent support elements being pivotally movable between a stowed position parallel to the major plane and an extended position away from the major plane, and a second support element between the spaced-apart vent support elements and movable between a stowed position parallel to the major plane and an extended position away from the major plane. The spaced-apart vent support elements may each include a pair of extending protrusions defining a louver gap. At least one of the extending protrusions may define a hook at a free end. The spaced-apart vent support elements may pivot on a vent support axis. The second support element may pivot on a second support axis.

16 Claims, 7 Drawing Sheets

(56) References Cited

U.S. PATENT DOCUMENTS

2016/0249472 A1    8/2016   Tu
2016/0294201 A1   10/2016   Avital
2019/0208046 A1    7/2019   Gluck

* cited by examiner

SMART DEVICE SUPPORT

CROSS-REFERENCE TO RELATED APPLICATION

This application is a Continuation-in-Part of U.S. patent application Ser. No. 16/564,363 filed on Sep. 9, 2019, entitled "MOBILE DEVICE MULTI-TOOL," which claims the benefit of U.S. Provisional Patent Application No. 62/728,943 filed on Sep. 10, 2018, entitled "MOBILE DEVICE MULTI-TOOL," which are hereby incorporated by reference in their entirety for all that is taught and disclosed therein.

FIELD OF THE INVENTION

The present invention relates to smartphones, and more particularly to a smart device support that is attached to a smartphone to support the smartphone in a variety of circumstances.

BACKGROUND OF THE INVENTION

Smartphones are desirable for use in a wide range of circumstances, including ones in which it is desirable to have them securely held or propped. Although a variety of existing cases for smartphones exist that provide the ability to prop or secure a smartphone, they are typically capable of performing only a limited variety of support functions.

Therefore, a need exists for a new and improved smart device support that enables a smartphone to be propped or secured in a variety of circumstances by a single apparatus. In this regard, the various embodiments of the present invention substantially fulfill at least some of these needs. In this respect, the smart device support according to the present invention substantially departs from the conventional concepts and designs of the prior art, and in doing so provides an apparatus primarily developed for the purpose of enabling a smartphone to be propped or secured in a variety of circumstances by a single apparatus.

SUMMARY OF THE INVENTION

The present invention provides an improved smart device support, and overcomes the above-mentioned disadvantages and drawbacks of the prior art. As such, the general purpose of the present invention, which will be described subsequently in greater detail, is to provide an improved smart device support that has all the advantages of the prior art mentioned above.

To attain this, the preferred embodiment of the present invention essentially comprises a frame defining a major plane and configured to connect to a smartphone, a pair of spaced-apart vent support elements each defining a louver gap configured to removably connect to a vehicle ventilation louver, the spaced-apart vent support elements being pivotally movable between a stowed position parallel to the major plane and an extended position away from the major plane, and a second support element between the spaced-apart vent support elements and movable between a stowed position parallel to the major plane and an extended position away from the major plane. The spaced-apart vent support elements may each include a pair of extending protrusions defining a louver gap. At least one of the extending protrusions may define a hook at a free end. The spaced-apart vent support elements may pivot on a vent support axis, and the second support element may pivot on a second support axis away from the vent support axis. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

An embodiment of the smart device support of the present invention is shown and generally designated by the reference numeral 10.

Figure 1:
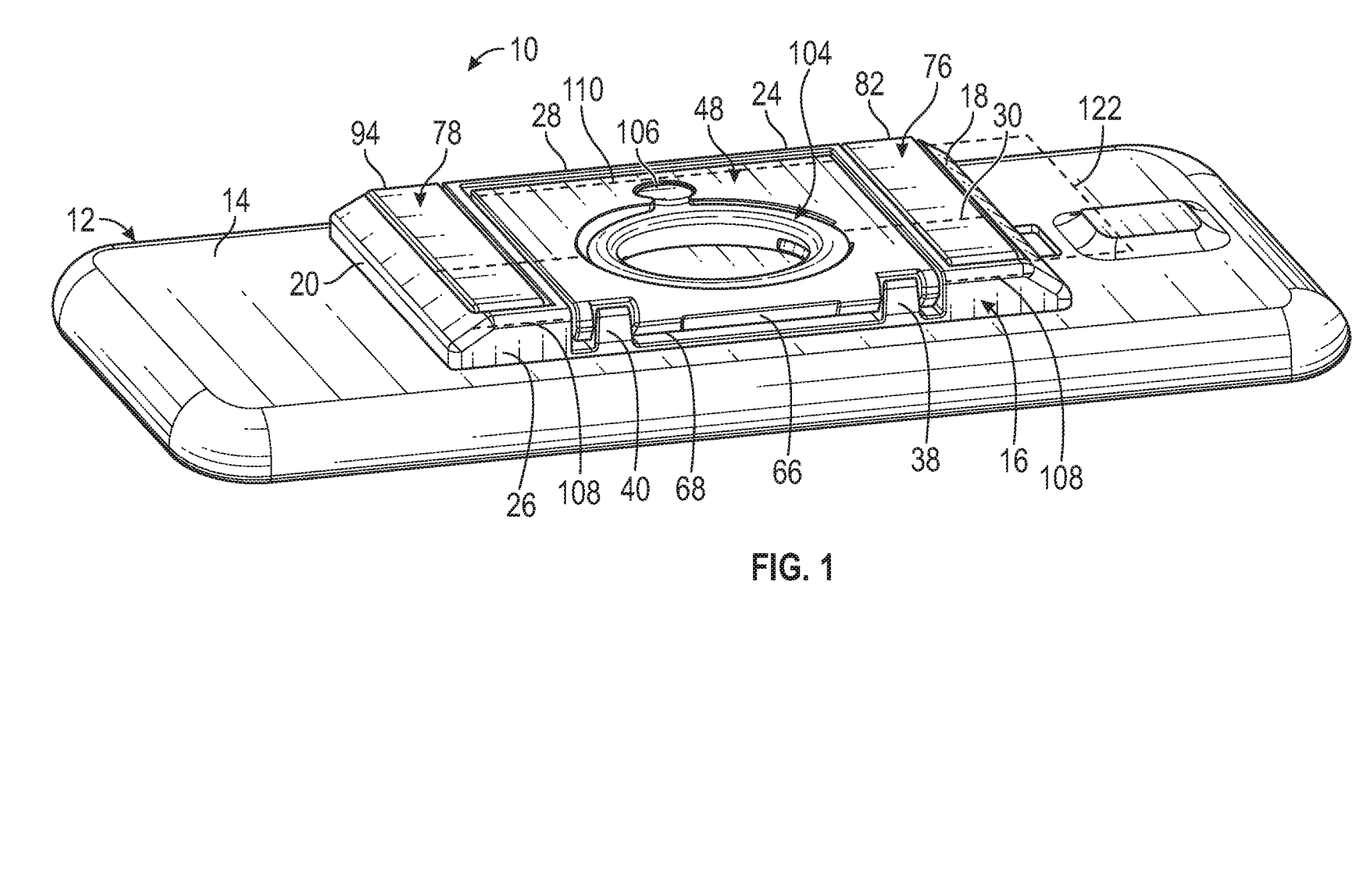
FIG. 1 is a rear isometric view of the current embodiment of a smart device support constructed in accordance with the principles of the present invention with the spaced-apart vent support elements, the second support element, and the third support element in the stowed position.
Figure 2:
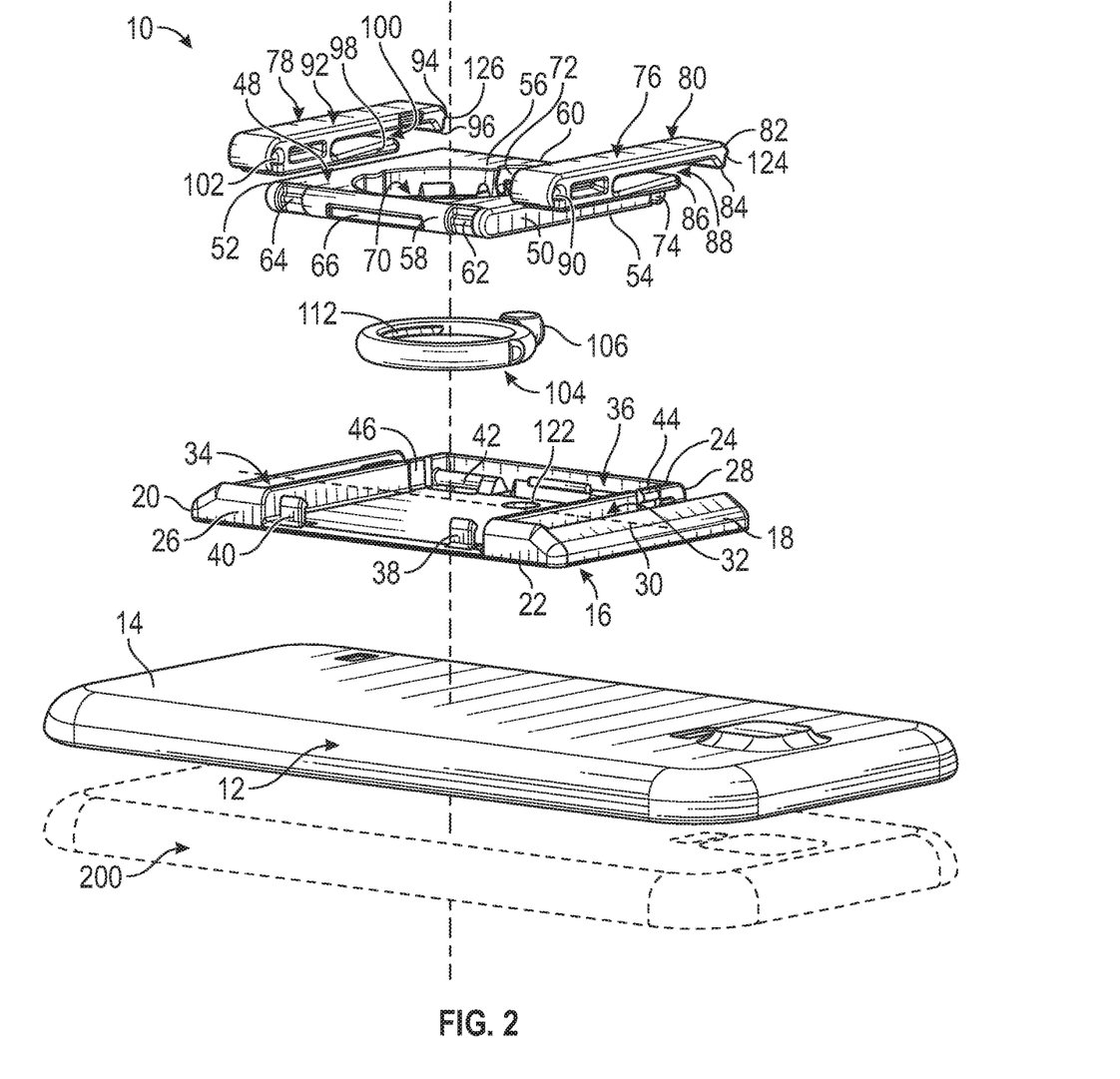
FIG. 2 is an exploded view of the smart device support of FIG. 1.

FIGS. 1 & 2 illustrate the improved smart device support 10 of the present invention. More particularly, the smart device support has a case 12 having a rear 14. The case is sized to closely receive a smartphone 200. A frame 16 having a top 18, bottom 20, front 22, rear 24, left side 26, right side 28, midline 30, and major plane has its front attached to the rear of the case by an adhesive or any other suitable method. The top rear of the frame defines a top recess 32, and the bottom rear of the frame defines a bottom recess 34. A top axle 114 (visible in FIG. 4) is located within the top recess adjacent to the left side of the frame, and a top detent 118 (visible in FIG. 4) is located within the top recess adjacent to the right side of the frame. A bottom axle 116 (visible in FIG. 4) is located within the bottom recess adjacent to the left side of the frame and a bottom detent 120 (visible in FIG. 4) is located within the bottom recess adjacent to the right side of the frame. The rear of the frame defines a rectangular space 36 located between the top and bottom recesses. A top retention hook 38 and a bottom retention hook 40 protrude rearwardly from the left front of the frame into the rectangular space. A pair of axles (axle 42 is visible) are located within the rectangular space adjacent to the right side of the frame. A semi-spherical recess is defined by the rear of the frame within the rectangular space between the pair of axles. A retention hook 44 protrudes rearwardly into the top recess of the frame, and a retention hook 46 protrudes rearwardly into the bottom recess of the frame.

A second support element 48 is pivotally attached to the rear 24 of the frame 16 and closely received by the rectangular space 36 of the frame. The second support element has a top 50, bottom 52, front 54, rear 56, left side 58, and right side 60. The left side of the second support element includes a top detent 62, a bottom detent 64, and defines a finger notch 66 between the top and bottom detents. The top and bottom detents are releasably engaged by the top and bottom retention hooks 38, 40 to releasably retain the free end 68 of the second support element within the rectangular space. The second support element defines a central aperture 70 and a socket 72 in communication with the central bore. The right front of the second support element defines a pair of hinges (hinge 74 is visible) that snap over the pair of axles (axle 42 is visible) in the rectangular space to pivotally attach the front right of the second support element to the rear of the frame.

A top spaced-apart vent support element 76 and a bottom spaced-apart vent support element 78 are pivotally attached to the rear 24 of the frame 16 and closely received by the top and bottom recesses 32, 34, respectively. The top spaced-apart vent support element has an upper extending protrusion 80 that includes a free end 82 with a hook 84 and a lower extending protrusion 86. A louver gap 88 is defined between the upper and lower extending protrusions. The upper extending protrusion defines a hinge 90 opposite the free end. The hinge snaps over the top axle 114 to pivotally attach the left end of the top spaced-apart vent support element to the rear of the frame. The bottom spaced-apart vent support element has an upper extending protrusion 92 that includes a free end 94 with a hook 96 and a lower extending protrusion 98. A louver gap 100 is defined between the upper and lower extending protrusions. The upper extending protrusion defines a hinge 102 opposite the free end. The hinge snaps over the bottom axle 116 to pivotally attach the left end of the bottom spaced-apart vent support element to the rear of the frame. The top and bottom spaced-apart vent support elements are releasably engaged by the retention hooks 44, 46, respectively to releasably retain the free ends of the top and bottom spaced-apart vent support elements within the top and bottom recesses. The top and bottom detents 118, 120 in the top and bottom recesses engage the hooks to also releasably retain the free ends of the top and bottom spaced-apart vent support elements within the top and bottom recesses. It should be appreciated that the hooks are located slightly behind the free ends to create finger engagement ledges 124, 126 (most clearly shown in FIG. 4).

A third support element 104 is a ring that is pivotally attached to the rear 56 of the second support element 48 by a protruding ball 106 captured within socket 72 of the second support element. The interior of the third support element defines a finger notch 112. The third support element is closely received by the central aperture 70 of the second support element. The semi-spherical recess 122 in the rectangular space 36 of the rear 24 of the frame 16 receives a portion of the ball when the second support element 48 is received by the rectangular space to provide clearance.

The top and bottom spaced-apart vent support elements 76, 78 are pivotally movable between a stowed position parallel to the major plane 122 of the frame 16 and an extended position away from the major plane. The second support element 48, which is located between the top and bottom spaced-apart vent support elements, is movable between a stowed position parallel to the major plane and an extended position away from the major plane. The top and bottom spaced-apart vent support elements pivot on a vent support axis 108, and the second support element pivots on a second support axis 110 away from the vent support axis. In the current embodiment, the vent support axis and second support axis are located on opposed sides of the midline 30 of the frame. The top and bottom spaced-apart vent support elements when in the stowed position define the rectangular space 36 therebetween, and the second support element is a rectangular body occupying the rectangular space. The free end 68 of the second support element extends toward the vent support axis when the second support element is in the stowed position.

Figure 3:
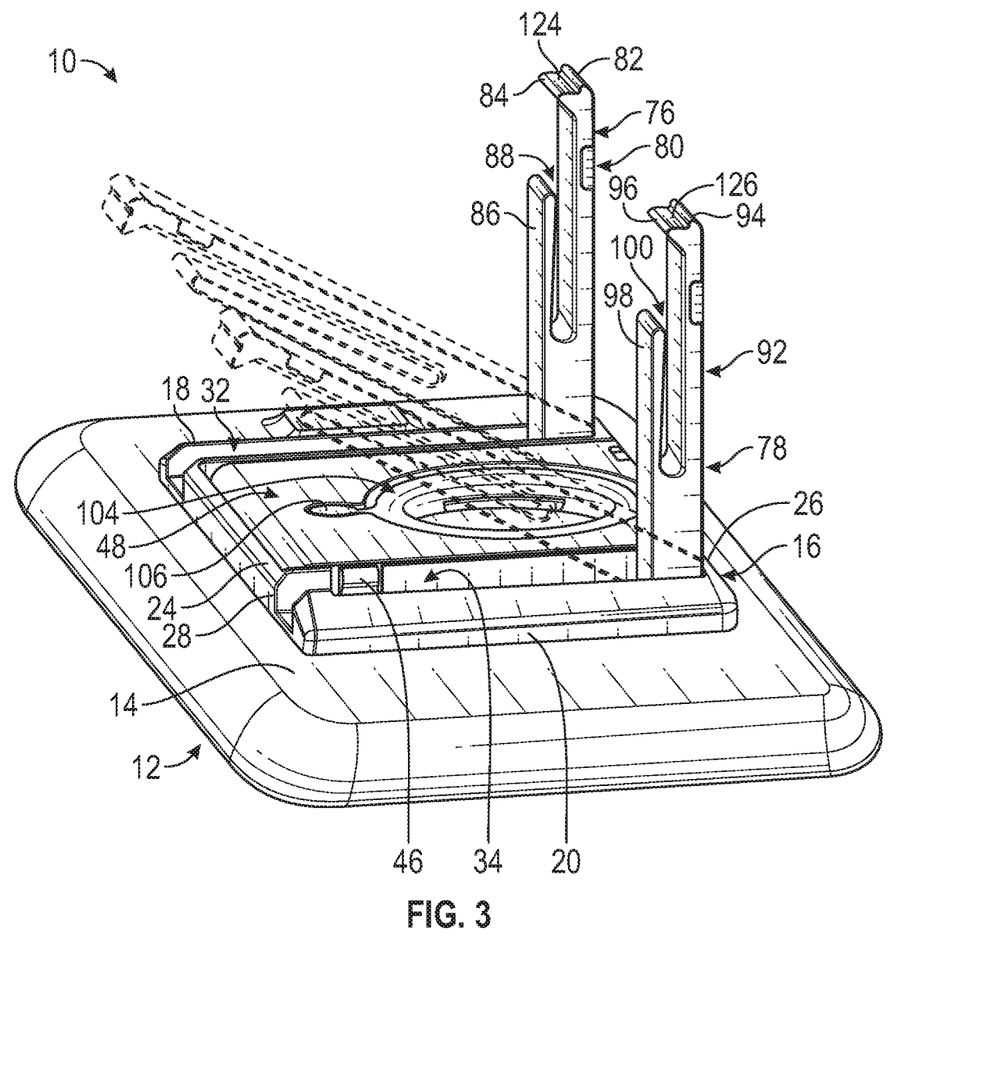
FIG. 3 is a rear isometric view of the smart device support of FIG. 1 with the spaced-apart vent support elements in the extended position and the second and third support elements in the stowed position.
Figure 4:
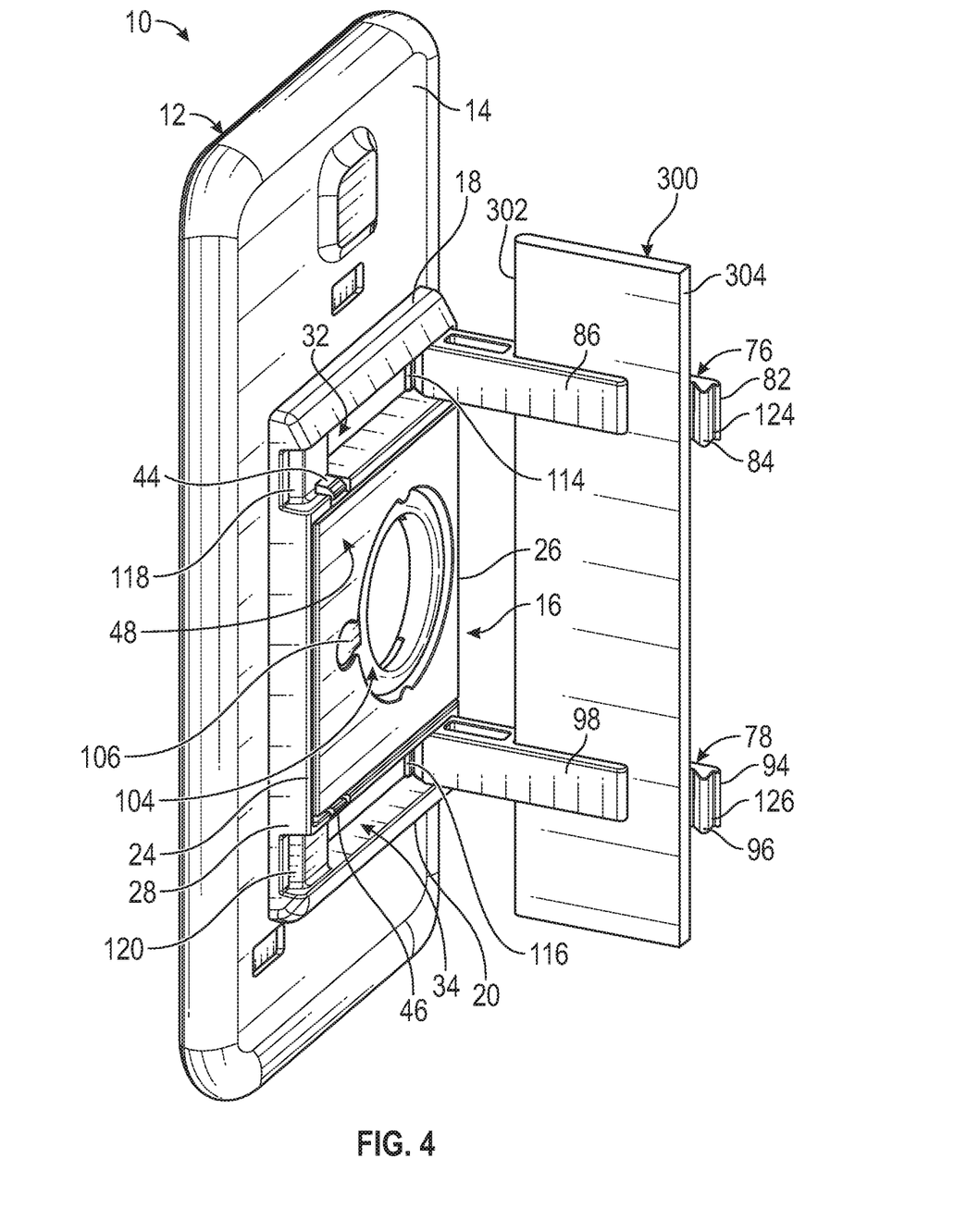
FIG. 4 is a rear isometric view of the smart device support of FIG. 1 with the spaced-apart vent support elements in the extended position receiving a vent louver and the second and third support elements in the stowed position.
Figure 5:
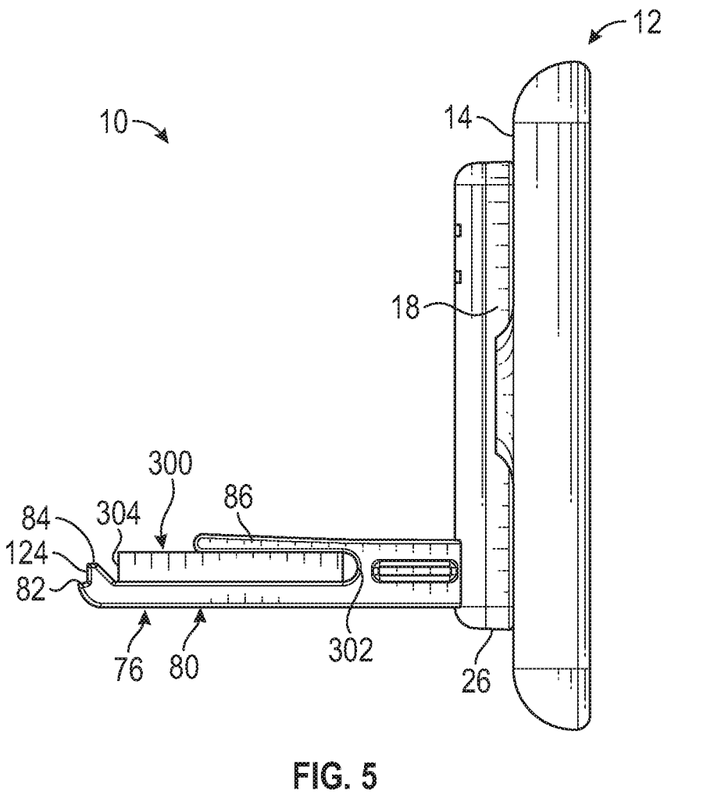
FIG. 5 is a top view of the smart device support of FIG. 1 with the spaced-apart vent support elements in the extended position receiving a vent louver and the second and third support elements in the stowed position.

FIGS. 3-5 illustrate the improved smart device support 10 of the present invention. More particularly, the top and bottom spaced-apart vent support elements 76, 78 of the smart device support have been released from their stowed position. This is accomplished by applying sufficient force to the finger engagement ledges 124, 126 to overcome the retention force exerted by the retention hooks 44, 46 and pivot the top and bottom spaced-apart vent support elements about top and bottom axles 114, 116. After the top and bottom spaced-apart vent support elements are pivoted into the fully extended position, a selected vent louver 300 having a front edge 302 and a rear edge 304 attached to a vehicle (not shown) is received within the louver gaps 88, 100 defined between the upper extending protrusions 80, 92 and the lower extending protrusions 86, 98. The hooks 84, 96 snap over the rear edge of the selected vent louver to resist removal of the selected vent louver from the louver gaps unless sufficient deliberate force is applied to the top and bottom spaced-apart vent support elements to flex the lower extending protrusions 86, 98 sufficiently for the vent louver to slide over the hooks. The lower extending protrusions clamp the vent louver against the upper extending protrusions so that the top and bottom spaced-apart vent support elements do not unintentionally slide down the vent louver under the influence of gravity. Although the primary purpose of the spaced-apart top and bottom vent support elements is to releasably connect a smartphone 200 to a selected vent louver as shown in FIGS. 4 and 5, it should also be appreciated that the spaced-apart top and bottom vent support elements can also be used to prop a smartphone 200 at a variety of angles when placed into a selected intermediate position denoted by the dashed lines in FIG. 3 or into the fully extended position.

Figure 6:
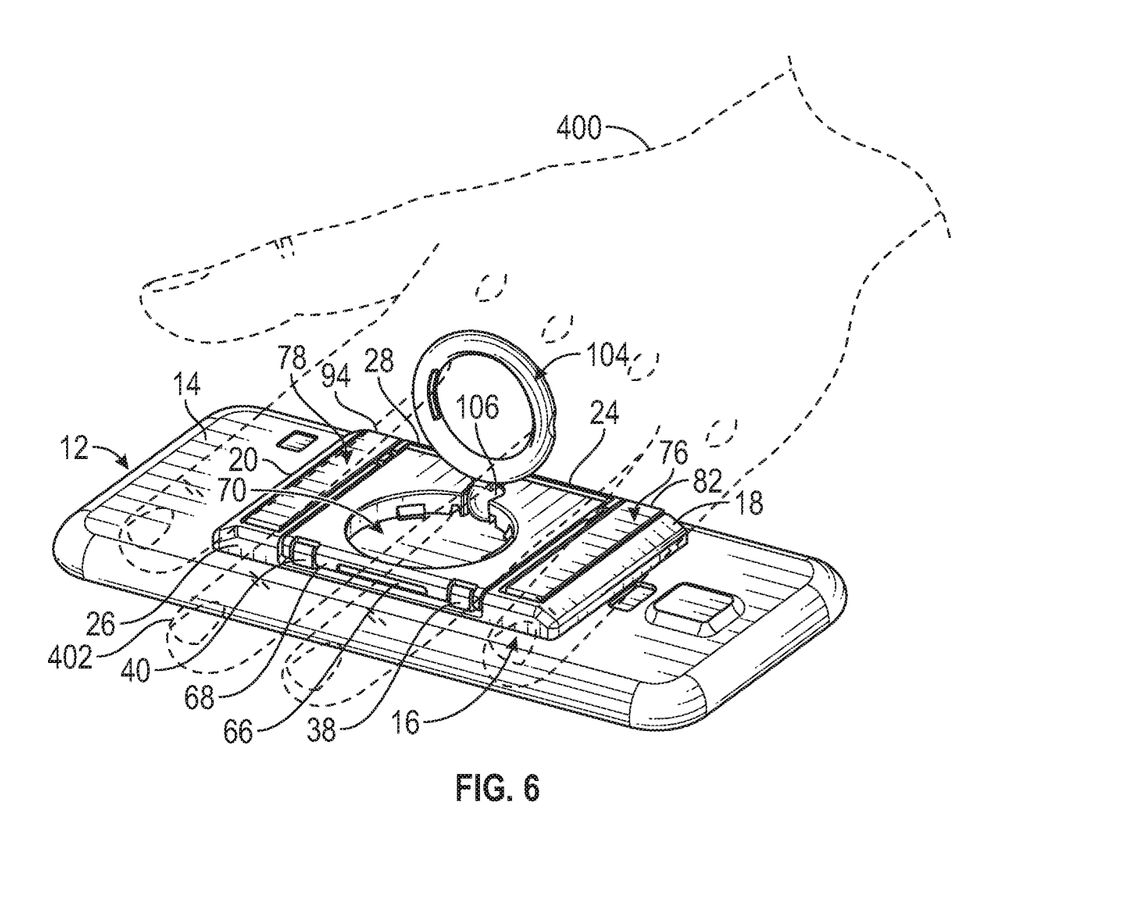
FIG. 6 is a rear isometric view of the smart device support of FIG. 1 with the spaced-apart vent support elements and the second support element in the stowed position, and the third support element in the extended position.

FIG. 6 illustrates the improved smart device support 10 of the present invention. More particularly, the third support element 104 of the smart device support has been released from its stowed position. This is accomplished by applying sufficient force to the finger notch 112 to overcome the retention forces created by five points of contact between the third support element and the second support element along with friction between the third support element and the central aperture 70 and socket 72 of the second support element and pivot the third support element about ball 106. The third support element is a ring configured to receive a user's finger 402, which enables the user to maintain a secure hold on a smartphone 200 without limiting positioning of the mobile device, even when the smartphone is held out at arm's length from the user. The ball and socket interface between the third support element and the second support element 48 enables the user to move their hand 400 in any desired manner (rotationally, up, down, laterally, circularly, or diagonally) without restriction from the third support element other than the hard boundaries of the third support element itself against the second support element.

Figure 7:
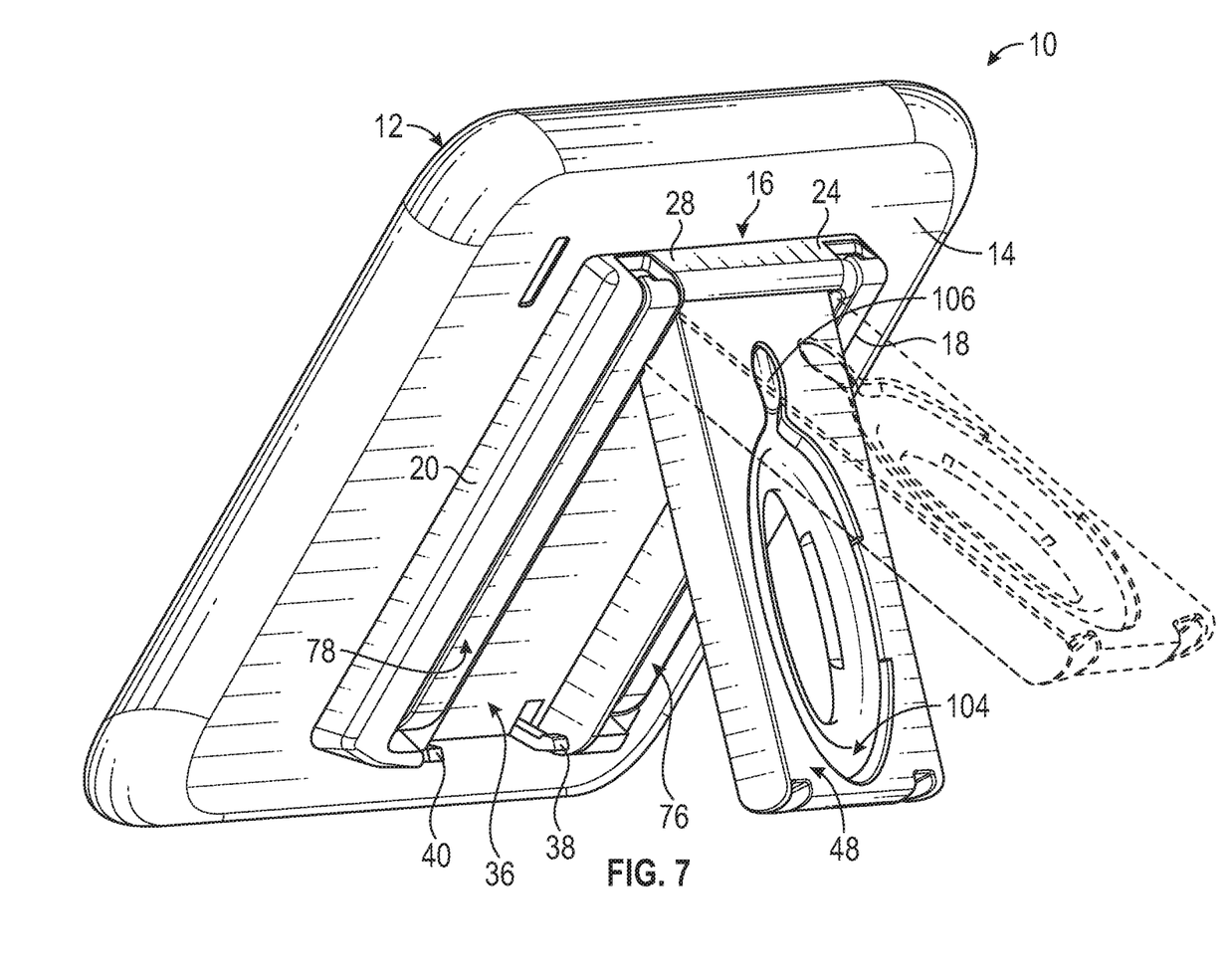
FIG. 7 is a rear isometric view of the smart device support of FIG. 1 with the spaced-apart vent support elements and the second support element in the stowed position, and the third support element in the extended position.

FIG. 7 illustrates the improved smart device support 10 of the present invention. More particularly, the second support element 48 of the smart device support has been released from its stowed position. This is accomplished by applying sufficient force to the finger notch 66 to overcome the retention force exerted by the top and bottom retention hooks 38, 40 and pivot the second support element about pair of axles (axle 42 is visible in FIG. 2) in the rectangular space 36. The second support element can be used to prop a smartphone 200 at a variety of angles when placed into a selected intermediate position as shown or into the fully extended position denoted by the dashed lines.

While a current embodiment of a smart device support has been described in detail, it should be apparent that modifications and variations thereto are possible, all of which fall within the true spirit and scope of the invention. For example, in addition to the smartphone described, the smart device support is also suitable for use with any suitable object including tablets, laptops, and any other mobile electronic computer system. Furthermore, the frame and support elements can be attached directly to the object to be supported without an intervening case, or the frame and support elements can be integrated into the rear of the case to result in an overall slimmer form. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A smart device support comprising:
a frame defining a major plane and configured to connect to a smartphone;
a pair of spaced-apart vent support elements each defining a louver gap configured to removably connect to a vehicle ventilation louver;
the spaced-apart vent support elements being pivotally movable between a stowed position parallel to the major plane and an extended position away from the major plane the vent support elements defining a first space therebetween when in the stowed position; and
a second support element between the spaced-apart vent support elements and movable between a stowed position parallel to the major plane and in the first space and an extended position away from the major plane.

2. The smart device support of claim 1 wherein the spaced-apart vent support elements each include a pair of extending protrusions defining a louver gap.

3. The smart device support of claim 2 wherein at least one of the extending protrusions defines a hook at a free end.

4. The smart device support of claim 1 wherein the spaced-apart vent support elements pivot on a vent support axis, and the second support element pivots on a second support axis away from the vent support axis.

5. The smart device support of claim 4 wherein the vent support axis and second support axis are on opposed sides of a midline of the frame.

6. The smart device support of claim 4 wherein the second support element has a free end extending toward the vent support axis when in the stowed position.

7. The smart device support of claim 4 wherein the spaced-apart vent support elements when in the stowed position define a rectangular space therebetween, and wherein the second support element is a rectangular body occupying the rectangular space.

8. The smart device support of claim 1 including a third support element pivotally connected to the second support element.

9. The smart device support of claim 8 wherein the third support element is a ring configured to receive a user's finger.

10. The smart device support of claim 8 wherein the second support element defines an aperture configured to closely receive the third support element.

11. The smart device support of claim 1 wherein the second support element is a ring configured to receive a user's finger.

12. The smart device support of claim 1 wherein the second support element is a prop configured to stabilize the device on a horizontal surface.

13. The smart device support of claim 1 including a third support element pivotally connected to the frame.

14. The smart device support of claim 1 wherein the second support element has a support surface configured to make supporting contact with a surface other than a vent louver.

15. The smart device support of claim 1 wherein the second support element having a support surface configured to extend away from the major plane when the vent support elements are in the stowed position.

16. The smart device support of claim 1 wherein the vent support elements and the second support elements are flush with the frame when in a stowed condition.

* * * * *